3,658,997
Patented Apr. 25, 1972

3,658,997
GOLD-BASE BRAZING ALLOYS
Meczyslaw Herman Sloboda, Pinner, Middlesex, and John Derek Boughton, High Wycombe, England, assignors to Johnson, Matthey & Company, Limited, London, England
No Drawing. Filed Aug. 15, 1969, Ser. No. 850,650
Claims priority, application Great Britain, Aug. 20, 1968, 39,805/68
Int. Cl. C22c 5/00
U.S. Cl. 75—165  4 Claims

ABSTRACT OF THE DISCLOSURE

A gold-base brazing alloy for use in the fabrication of jewellery articles, jet engines and high quality engineering components comprising 30 to 80 wt. percent gold, 0.5 to 67.5 wt. percent copper and 2.0 to 12.0 wt. percent nickel. Additionally, the brazing alloy may include 0.5 to 7.0 wt. percent chromium and from a trace up to 0.5 wt. percent boron.

---

This invention relates to brazing alloys and in particular to gold-base brazing alloys for use in the fabrication of jewellery articles, jet engines and other high-performance components.

There are many gold-base brazing alloys to which certain specific properties have been imparted by judicious selection of alloying additions. For example, a gold-nickel alloy containing 17.5 wt. percent nickel is especially useful for vacuum brazing of parts that must have good resistance to oxidation and high strength (up to 40 tons/sq. inch) at elevated temperatures. This alloy which melts at 950° C. and has practically no freezing range, has another useful property of producing joints that are resistant to crevice corrosion.

Alloys of this kind are particularly useful for joining stainless steel components, turbine and jet engine parts and other specialized equipment operating under exacting service conditions. It is in connection with the fabrication of high-performance components, especially in the aircraft and aero-engine industries, that a demand has arisen for a brazing alloy which, in addition to being economical in use, must meet the following requirements: A melting point below 1000° C.; freedom from volatile constituents so that the alloy can be used for vacuum brazing; good joint filling properties; ability to produce brazed parts whose surface after brazing is sufficiently smooth not to have a detrimental effect on the flow of gases (for example, in jet engines); good oxidation resistance and high strength at temperatures of up to 500° C.; no tendency to excessive alloying with the parent metals.

The binary gold-nickel alloys already mentioned have been used with a certain degree of success, but the alloys are very expensive and some of the properties mentioned are constantly requiring improvement.

It is an object of this invention to provide brazing alloys having a noble metal base and exhibiting improved brazing and mechanical properties. A further object of the invention is to produce alloys of the kind mentioned which are more economical in use and the brazing and mechanical properties of which can, to some degree, be adjusted by varying their composition.

According to this invention a brazing alloy comprises 30% to 80% by weight of gold 0.5 to 67.5% by weight of copper and 2.0% to 12.0% by weight of nickel.

The alloy may include in addition one or both of the elements chromium and boron within the ranges of 0.5% to 7.0% by weight of chromium and from a trace to 0.5% by weight of boron.

Alloys so constituted have been found to possess good brazing and mechanical properties as well as conforming to the above-mentioned other requirements and at a cost which is lower than the binary alloys at present in use due to the reduction of the gold content as compared with the known alloys.

From the ranges set out above alloys may be selected which are particularly suitable for the brazing of jet engine and other high performance components. These alloys are found to have a much improved surface finish on solidifying and better joint-filling properties than known alloys.

Two alloy compositions which have been found to be particularly useful for the brazing, for example, of high performance jet engine components are:

(i) Au, 68; Cu, 22; Ni, 10.
(ii) Au, 68; Cu, 21.9; Ni, 9; Cr, 1; B, 0.1.

The alloy (ii) has been found to have considerably better resistance to oxidation at temperatures around 500° C. and is slightly stronger than alloy (i). It is found that the chromium addition imparts good oxidation resistance to alloy whilst lowering its wettability. However, it is found that the addition of boron restores and improves the wettability of the alloy and promotes the formation of good smooth surfaces on solidification, in addition to improving the joint filling properties of the alloy.

We claim:
1. A brazing alloy consisting essentially of 68 wt. percent of gold, 21.9 to 22 wt. percent of copper, 9 to 10 wt. percent of nickel and 0 to 1 wt. percent of chromium.
2. A brazing alloy as claimed in claim 1 an including from a trace to 0.5 wt. percent of boron.
3. A gold base brazing alloy which consists essentially of 68.0 wt. percent of gold, 22.0 wt. percent of copper and 10.0 wt. percent of nickel.
4. A gold base brazing alloy which consists essentially of 68.0 wt. percent of gold, 21.9 wt. percent of copper, 9.0 wt. percent of nickel, 1.0 wt. percent of chromium and 0.1 wt. percent of boron.

References Cited
UNITED STATES PATENTS

| 1,469,191 | 9/1923 | Sheff et al. | 75—165 |
| 2,813,790 | 11/1957 | Hack | 75—165 |

FOREIGN PATENTS

| 575,257 | 4/1933 | Germany | 75—165 |

L. DEWAYNE RUTLEDGE, Primary Examiner
E. L. WEISE, Assistant Examiner

U.S. Cl. X.R.
75—159